Nov. 10, 1959   E. W. BREISCH   2,912,199
CABLE CLAMPS
Filed Jan. 9, 1956   2 Sheets-Sheet 1

INVENTOR.
Edgar W. Breisch
BY
W. L. Stout
HIS ATTORNEY

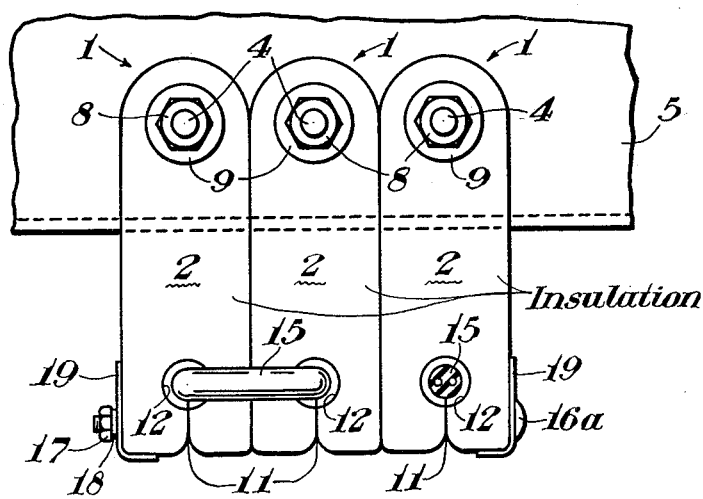
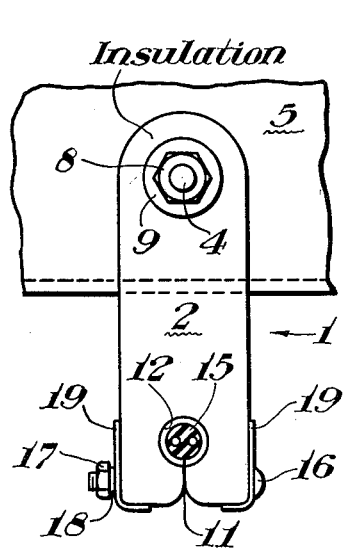
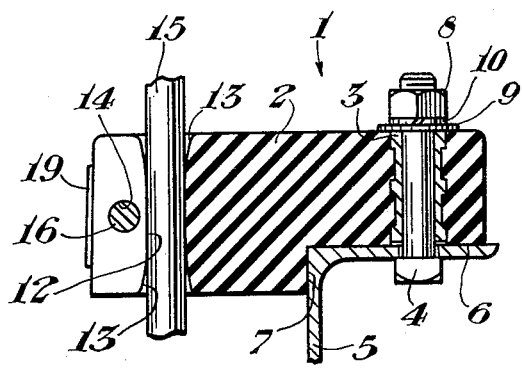

United States Patent Office 2,912,199
Patented Nov. 10, 1959

2,912,199

CABLE CLAMPS

Edgar W. Breisch, Edgewood, Pa., assignor to Westinghouse Air Brake Company, Wilmerding, Pa., a corporation of Pennsylvania Application January 9, 1956, Serial No. 558,041

1 Claim. (Cl. 248—74)

My invention relates to cable clamps, and particularly to a cable clamp which may be used singularly as a cable retainer or in multiple as a cable support in suspended cable installations of several hundred feet in height.

In suspended cable installations, as for example in elevator shaftways or in television towers several hundred feet in height, the length of the required cable presents a problem of properly supporting the weight of the cable and a problem of maintaining the cable in its vertical position. Common practice in such installations is to support the cable about every hundred feet and to provide retainers about every ten feet to hold the cable in a vertical line. In exposed installations, such as in television towers, the cables are subject to the elements, particularly the winds. High winds in such installations cause excessive vibrations of the suspended cables and are responsible for many of the cable failures. Due to the excessive vibrations of the cable, stresses are set up in the cable at the points of suspension or retention resulting in the fracture of the cable conductors at these points. It has also been found that the cable clamps and supports formerly provided resulted in attenuation of the signals carried by the cable conductors due to the inclusion in such clamps and supports of short-circuiting rings or other high loss elements.

It is therefore an object of my invention to provide a cable clamp whereby excessive vibrations of a cable held by the clamp are effectively snubbed.

Another object of my invention is to provide a cable clamp whereby the stresses set up by the vibrations of the cable at the point of clamping the cable are minimized.

Still another object of this invention is to provide a cable clamp which when used in multiple forms a cable support capable of supporting the weight of a cable in installations of great height, the cable support formed of a plurality of clamps retaining the snubbing and stress relieving features of the individual cable clamps.

Still a further object of my invention is to provide a cable clamp in which high loss elements are avoided to minimize signal attenuation by the cable retainer or support.

In carrying out my invention I provide an elongated block having a suitable mounting hole therein for securing the block to a cross piece, or the like, of a shaftway or tower, and a slitted cable opening for receiving the suspended cable. The block forming my novel cable clamp is preferably made of a molded resilient material, as for example, rubber or a rubber compound such as neoprene. The slit end of the clamping block is provided with a horizontally disposed bolt opening, the cable after being inserted in the cable opening of the block being clamped in the block by the clamping action of a bolt passing through the opening, and a nut. I have found that the resilient material of the block has a snubbing or damping action on the vibrations of the cable thereby reducing excess vibrations of the cable. I have also found that by beveling or flaring the ends of the cable openings that the stresses set up in the cable conductors due to cable vibrations are minimized.

In using my novel cable clamp as a cable support, I mount three cable clamps side by side on a suitable crosspiece or the like, of the shaftway or tower. The cable to be supported is threaded upwardly through one end clamp, downwardly through the center clamp and then upwardly through the other end clamp, the cable being bent in the form of an S-loop. A single bolt through the three clamps provides the necessary pressure to hold and support the suspended cable.

Other objects and features of my invention will be apparent as the course of the specification progresses.

In the accompanying drawings wherein I have illustrated two possible embodiments of my invention and wherein similar reference characters designate similar elements throughout the several views.

Fig. 2 is a top plan view of the cable clamps embodying my invention mounted to support the weight of a cable.

Fig. 3 is a top plan view of a cable clamp mounted to retain a cable against excessive vibration, while Fig. 4 is a cross sectional view taken along the line IV—IV of Fig. 1.

Figure 1:
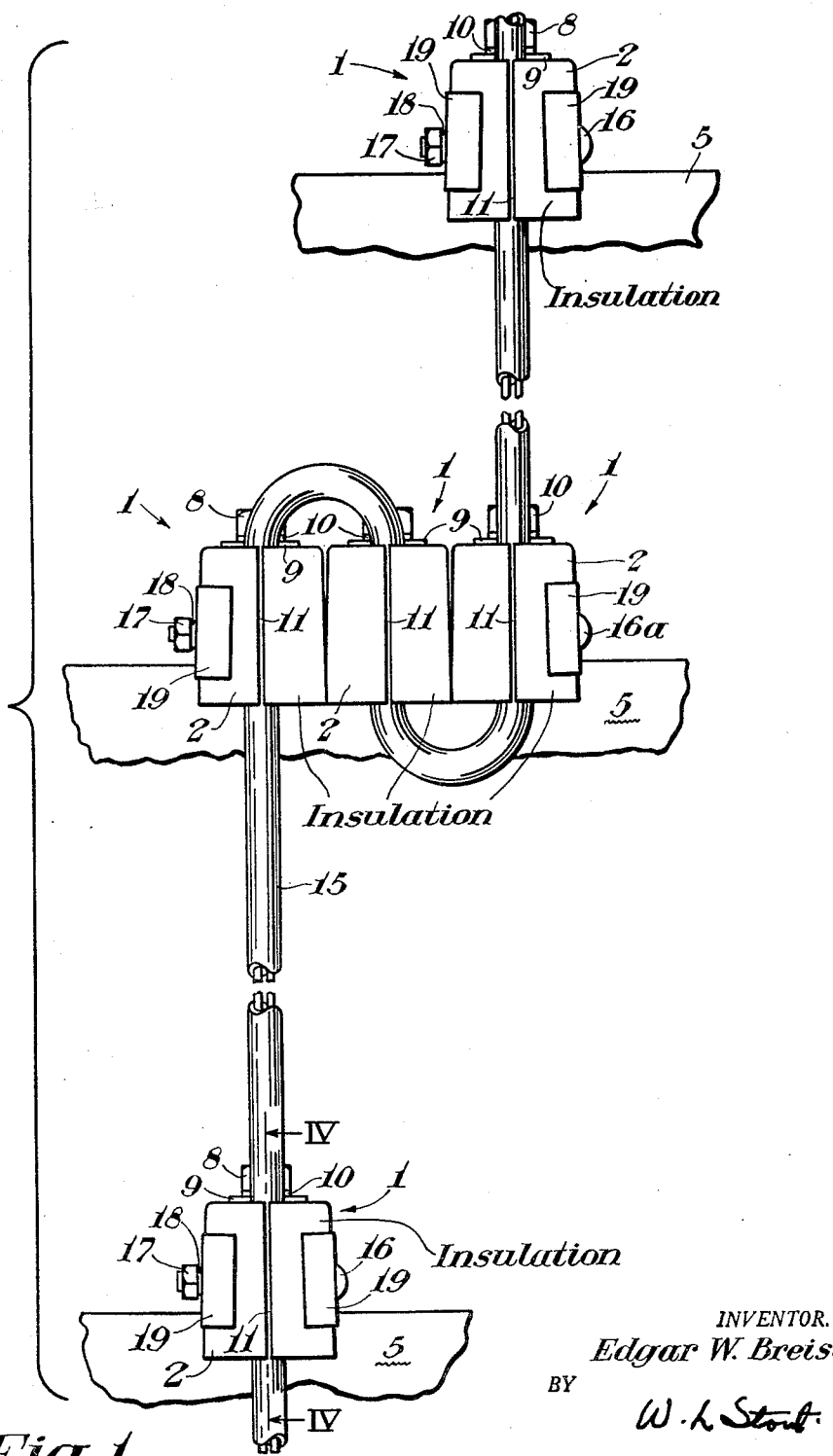
Fig. 1 is a fragmentary front elevational view illustrating cable clamps embodying my invention supporting the weight of a suspended cable in a tower and retaining the cable at intermediate points between the supports against excessive vibration.

Referring now in detail to the drawings, the reference numeral 1 designates a cable clamp embodying my invention. The cable clamp 1 comprises an elongated molded block 2 preferably of a resilient material such as rubber, or a rubber compound such as neoprene. The clamp block 2 has molded therein a cylindrical metal insert 3 (Fig. 4) for the insertion of a bolt 4 to secure the cable clamp to a cross-piece 5 of a tower or the like (not illustrated). The block 2 is formed with a cut away portion (Fig. 4) on its underside forming a recess 6 which rests on the tower cross-piece 5, the shoulder 7 of the recess abutting the edge of the cross-piece 5 to prevent turning of the clamp. The cable clamp 1 is bolted to the cross-piece 5 by the bolt 4 passing upwardly through the cross-piece and insert 3 and secured by a nut 8; a washer 9 and lockwasher 10 being interposed between the nut and the block.

The forward end of the block 2 is slit as at 11, the slit terminating in a vertically disposed opening 12 in the block. The opening 12 is beveled or flared at its ends as indicated at 13 in Fig. 4 for reasons hereinafter appearing. The block 2 is further provided with a horizontally disposed opening 14 passing through the slit forward end of the block. The slit end of the block 2 facilitates the insertion of a cable 15 into the opening 12, a bolt 16 passing through the horizontal opening 14 and a nut 17 and lockwasher 18 serving to clamp the cable in the block opening 12. The block 2 being preferably made of a resilient material such as neoprene, is provided with metal L-shaped clamping members 19 having suitable bolt openings, the clamping members being clamped to the outer sides of the block by the bolt 16 and nut 17 to provide the necessary clamping pressure to hold the cable 15.

The cable clamp 1 thus far described will support and retain short sections of vertically disposed cable in a shaftway or tower. In cable installations of several hundred or a thousand feet, as for example in a television antenna tower, the weight of the cable is supported about every one hundred feet and retained to prevent excessive vibrations at intermediate points about every ten feet. The cable clamp 1 which I have devised may also be used to support a cable several hundred feet in length.

In Figs. 1 and 2 I have illustrated how three cable clamps may be used to support a vertically disposed cable. The three cable clamps 1 are secured side by side on the cross-piece 5 in the manner described. The cable 15 is inserted so that it passes up through one of the end cable clamps, downwardly through the middle cable cable clamps, downwardly through the middle cable clamp, and upwardly through the other end clamp. The cable being flexible, will be bent in an S-loop as illustrated. A long bolt 16a is passed through the horizontally disposed openings 14 in the cable clamps after the cable is installed and pressure applied through the clamping plates 19 on the outer sides of the end clamps to clamp and hold the cable.

In cable installations for the control of an elevator car wherein the cable includes a high frequency conductor and the elevator car has secured thereto a loop or coil inductively coupled to the conductor for the transmission of control signals to operate the car, the cable should be maintained in a vertical position in substantial alignment with the center line of the transmitting loop. In such installations it is therefore preferable to align the center line of the transmitting loop and the center line of the middle clamp forming the cable support and alternately forming the S-loops in the cable at one support to the right as illustrated in Fig. 1 and then to the left at the next support, and so on, to the top of the tower. In this way, the cable is maintained in a vertical position, the relative position of the cable shifting approximately two inches from one side of the transmitting loop center line to the other between succeednig cable supports.

A single cable clamp 1 when used as a cable retainer serves a dual function in cable installations of several hundred feet in height. In installations such as elevator shaftways, too great a sag or sway in the control cable may result in the car rubbing against or even hooking onto the cable thus resulting in damage to the cable and possibly the control system. When a single cable clamp is used, it acts as a retainer to prevent the suspended cable from departing too far from a vertical position. The single cable clamp also serves to relieve the stresses in the cable because of the flared openings provided in the clamp. The flaring of the cable opening in the clamp provides a relative long radius over which the cable may bend. Sharp corners on previous cable clamps resulted in a fracture of the cable conductors when the cable was subject to vibrations.

A further advantage of my novel cable clamp when used either singularly as a cable retainer or in multiple as a cable support lies in the fact that the cable clamp is preferably made of a resilient material such as the molded neoprene described. The yielding plastic nature of the material exerts a snubbing action of the cable thereby preventing excessive vibration of the cable and premature failure due to fracturing of the conductors.

Still another advantage in the use of my cable clamps either as a cable retainer or as a cable support is that no short-circuiting rings or high loss elements are included in the clamp construction which may cause attenuations of the signals carried by the cable conductors.

Although I have herein shown and described only two embodiments of a cable clamp embodying my invention, it is understood that various changes and modifications may be made therein within the scope of the appended claim without departing from the spirit and scope of my invention.

Having thus described my invention, what I claim is:

A cable clamp comprising three clamping elements, each of said clamping elements comprising a block of resilient material having an opening therein for receiving a cable passing through the opening of an end element in one direction, through the opening of an intermediate element in opposite direction and through the opening of the other end element in the one direction, the openings in said clamping elements being flared at their ends, each of said clamping elements being formed with a slit at one end terminating in an opening and a shouldered recess on the underside of the clamping element at the other end, a cylindrical insert molded in each clamping element normal to said recess, a bolt passing through the insert of each clamping element for securing said elements to a support, said shouldered recess of each of said clamping elements being arranged to be mounted on the support with the shoulder of the recess abutting the edge of the support, and means for clamping the slit end of each of said clamping elements together to secure the cable within the clamping element openings, said means including clamping plates disposed exteriorly of said end elements adjacent the slit end.

References Cited in the file of this patent

UNITED STATES PATENTS

| | | |
|---|---|---|
| 1,017,508 | Callahan | Feb. 13, 1912 |
| 1,385,463 | Masury et al. | July 26, 1921 |
| 1,778,503 | Lord | Oct. 14, 1930 |
| 1,844,168 | Knapp | Feb. 9, 1932 |
| 2,227,528 | Adler | Jan. 7, 1941 |
| 2,362,124 | Ellinwood | Nov. 7, 1944 |
| 2,558,345 | Dickman | June 26, 1951 |
| 2,582,384 | Knollman | Jan. 15, 1952 |
| 2,746,727 | Earl | May 22, 1956 |

FOREIGN PATENTS

| | | |
|---|---|---|
| 544,618 | Great Britain | Apr. 21, 1942 |